US009297307B2

(12) United States Patent
Lior et al.

(10) Patent No.: US 9,297,307 B2
(45) Date of Patent: Mar. 29, 2016

(54) POWER CABLE AND CONNECTOR ARRANGEMENT FOR A GAS TURBINE ENGINE

(71) Applicant: United Technologies Corporation, Hartford, CT (US)

(72) Inventors: Raphael Lior, Brookline, MA (US); Nathan Snape, Tolland, CT (US)

(73) Assignee: United Technologies Corporation, Hartford, CT (US)

(*) Notice: Subject to any disclaimer, the term of this patent is extended or adjusted under 35 U.S.C. 154(b) by 876 days.

(21) Appl. No.: 13/647,614

(22) Filed: Oct. 9, 2012

(65) Prior Publication Data

US 2014/0133973 A1    May 15, 2014

Related U.S. Application Data

(60) Provisional application No. 61/707,124, filed on Sep. 28, 2012.

(51) Int. Cl.
*F01D 25/24* (2006.01)
*F02C 7/00* (2006.01)

(52) U.S. Cl.
CPC .............. *F02C 7/00* (2013.01); *F05D 2220/76* (2013.01); *F05D 2230/72* (2013.01); *F05D 2260/30* (2013.01); *Y10T 29/49229* (2015.01)

(58) Field of Classification Search
CPC ... F02C 7/00; F05D 2220/76; F05D 2260/30; F05D 2230/72; Y10T 29/49229
See application file for complete search history.

(56) References Cited

U.S. PATENT DOCUMENTS

| 4,591,794 | A | 5/1986 | Shattuck et al. |
| 5,144,793 | A | 9/1992 | Able et al. |
| 7,703,270 | B2 | 4/2010 | Lefebvre et al. |
| 7,726,134 | B2 | 6/2010 | Pasquinelli et al. |
| 8,197,288 | B1 | 6/2012 | Patel et al. |
| 2006/0237582 | A1 | 10/2006 | Layland et al. |
| 2007/0289312 | A1 | 12/2007 | Daukant |
| 2009/0064684 | A1 | 3/2009 | Cloft |
| 2009/0129922 | A1* | 5/2009 | Cloft et al. ............. 415/213.1 |
| 2009/0165464 | A1 | 7/2009 | Gotz et al. |
| 2010/0170887 | A1 | 7/2010 | Alexander et al. |

FOREIGN PATENT DOCUMENTS

EP         1998012 A2     12/2008

OTHER PUBLICATIONS

International Search Report and Written Opinion of the International Searching Authority for International application No. PCT/US2013/061333 dated Jul. 3, 2014.

* cited by examiner

*Primary Examiner* — Igor Kershteyn
(74) *Attorney, Agent, or Firm* — Carlson, Gaskey & Olds

(57) ABSTRACT

A gas turbine engine component assembly according to an exemplary aspect of the present disclosure includes, among other things, a nacelle including a moveable portion. A generator is configured to be received within a space established by the nacelle. A plurality of cables are at least partially supported on the moveable portion of the nacelle, the plurality of cables being selectively electrically coupled with the generator.

17 Claims, 3 Drawing Sheets

POWER CABLE AND CONNECTOR ARRANGEMENT FOR A GAS TURBINE ENGINE

CROSS REFERENCE TO RELATED APPLICATION

This application claims priority to U.S. Provisional Application No. 61/707,124 which was filed on Sep. 28, 2012.

BACKGROUND

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A gas turbine engine typically also includes an integrated drive generator (IDG). Several power cables are connected with the IDG. There are known wire harness configurations for situating the power feeder cables within the engine. For example, various clamps mounted to bracket arrangements are used for holding portions of the cables in place. The brackets are secured to various engine components. This approach has introduced complexity into the task of routing the cables around the engine components and has sometimes required modifying one or more engine components to accommodate the wires or brackets. Additionally, the power feeder cables may interfere with engine component removal envelopes during maintenance or repair procedures, which introduces additional labor and complexity into such procedures.

SUMMARY

A gas turbine engine component assembly according to an exemplary aspect of the present disclosure includes, among other things, a nacelle including a moveable portion. A generator is configured to be received within a space established by the nacelle. A plurality of cables are at least partially supported on the moveable portion of the nacelle, the plurality of cables being selectively electrically coupled with the generator.

In a further non-limiting embodiment of the foregoing gas turbine engine component assembly, a connector includes a first portion supported within the space near the generator and a second portion coupled to the plurality of cables near an end of the cables, the first and second portions being selectively coupled to electrically couple the cables with the generator.

In a further non-limiting embodiment of either of the foregoing gas turbine engine component assemblies, the moveable portion is moveable between an open position and a closed position. The connector second portion is supported on the moveable portion of the nacelle and the connector first portion is situated in a position where the connector second portion makes an electrically conductive connection with the connector first portion when the moveable portion of the nacelle is in the closed position.

In a further non-limiting embodiment of any of the foregoing gas turbine engine component assemblies, at least one of the connector first portion or the connector second portion comprises a male connector member and the other of the connector second portion or the connector first portion comprises a corresponding female connector member situated to at least partially receive the male connector member when the moveable nacelle portion is in the closed position.

In a further non-limiting embodiment of any of the foregoing gas turbine engine component assemblies, the connector first portion is magnetically coupled with the connector second portion when the moveable portion of the nacelle is in the closed position.

In a further non-limiting embodiment of any of the foregoing gas turbine engine component assemblies, the connector first and second portions are electrically disconnected when the nacelle moveable portion is in the open position.

In a further non-limiting embodiment of any of the foregoing gas turbine engine component assemblies, the connector first portion is formed as part of the generator.

In a further non-limiting embodiment of any of the foregoing gas turbine engine component assemblies, the moveable portion of the nacelle has an inner surface facing toward the generator and the cables are at least partially supported on the inner surface.

In a further non-limiting embodiment of any of the foregoing gas turbine engine component assemblies, a plurality of brackets are secured to the inner surface of the moveable portion of the nacelle, each of the brackets supporting a corresponding section of at least one of the cables.

A gas turbine engine component assembly, according to an exemplary aspect of the present disclosure includes, among other things, a nacelle including a moveable portion that at least partially establishes a cavity within the nacelle when the moveable portion is in a closed position. An electrically conductive connector includes a first connector portion within the cavity and a second connector portion supported on the nacelle moveable portion, the first and second connector portions selectively establishing an electrically conductive connection when the nacelle moveable portion moves into the closed position.

In a further non-limiting embodiment of the foregoing gas turbine engine component assembly, a plurality of cables are at least partially supported on the moveable portion of the nacelle, the plurality of cables being electrically coupled with the second connector portion.

In a further non-limiting embodiment of either of the foregoing gas turbine engine component assemblies, a generator is near the first connector portion within the space and electrically connected with the connector first portion. The cables are electrically connected to the generator when the moveable nacelle portion moves into the closed position.

In a further non-limiting embodiment of any of the foregoing gas turbine engine component assemblies, the connector first portion comprises a part of the generator.

In a further non-limiting embodiment of any of the foregoing gas turbine engine component assemblies, the moveable portion of the nacelle has an inner surface and the cables are at least partially supported on the inner surface.

In a further non-limiting embodiment of any of the foregoing gas turbine engine component assemblies, a plurality of brackets are secured to the inner surface of the moveable portion of the nacelle, each of the brackets supporting a corresponding section of at least one of the cables.

In a further non-limiting embodiment of any of the foregoing gas turbine engine component assemblies, at least one of the connector first portion or the connector second portion comprises a male connector member. The other of the connector second portion or the connector first portion comprises a corresponding female connector member situated to at least partially receive the male connector member when the moveable nacelle portion is in the closed position.

In a further non-limiting embodiment of any of the foregoing gas turbine engine component assemblies, the male connector member comprises a tab and the female connector member comprises a clamp spring.

In a further non-limiting embodiment of any of the foregoing gas turbine engine component assemblies, the connector first portion is magnetically coupled with the second portion.

In a further non-limiting embodiment of any of the foregoing gas turbine engine component assemblies, the connector first and second portions are electrically disconnected when the nacelle moveable portion is in another position.

A method of working on a gas turbine engine according to another exemplary aspect of the present disclosure includes, among other things, moving a nacelle portion into one of an open position or a closed position and at least one of: (1) establishing an electrically conductive connection between an integrated drive generator and a plurality of cables at least partially supported on the nacelle portion when moving the nacelle portion into the closed position, or (2) disconnecting the electrically conductive connection between the integrated drive generator and the plurality of cables when moving the nacelle portion into the open position.

The various features and advantages of disclosed examples will become apparent to those skilled in the art from the following detailed description. The drawings that accompany the detailed description can be described as follows.

DETAILED DESCRIPTION

Figure 1:
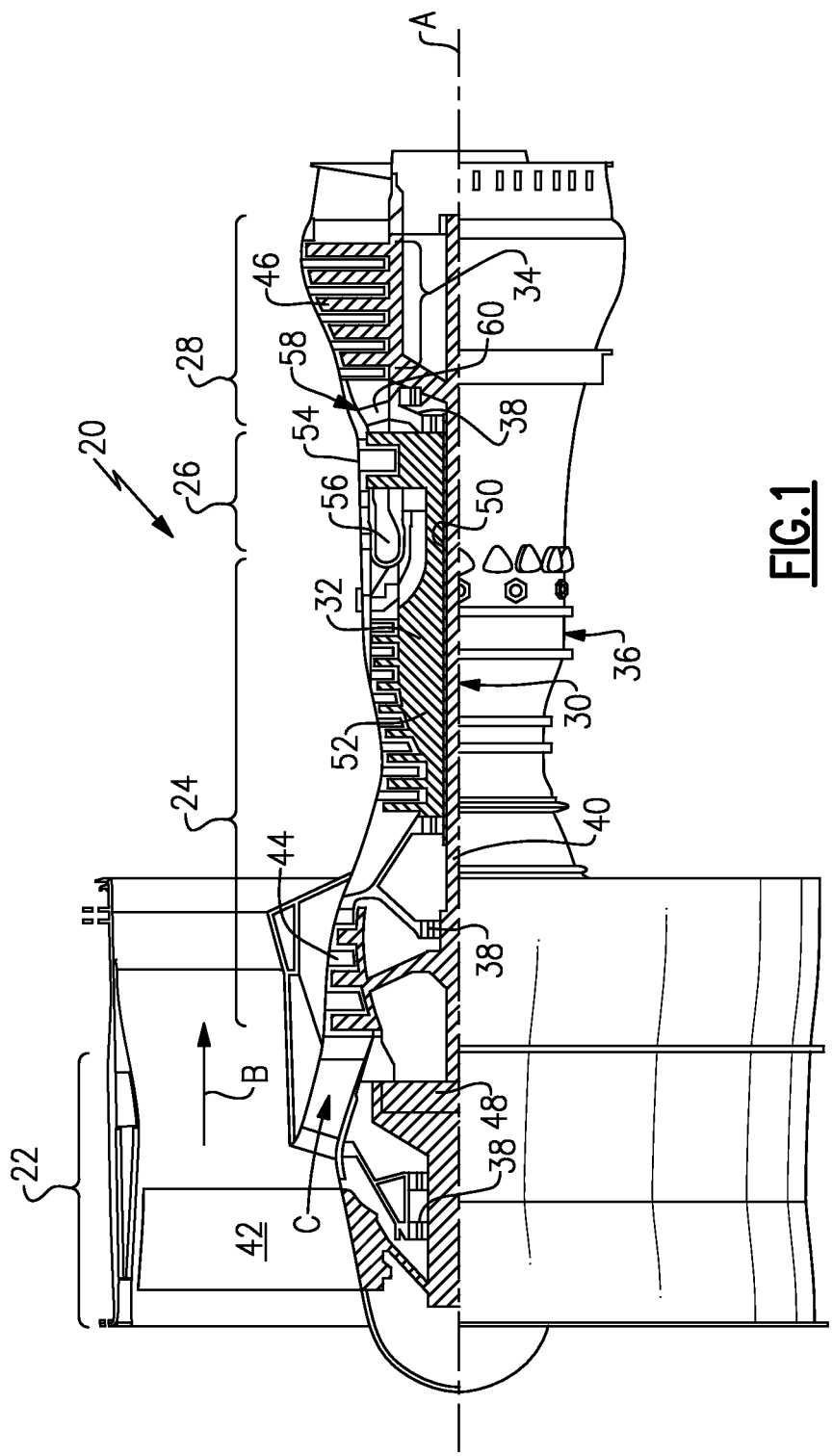
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to the combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts disclosed in this description and the accompanying drawings are not limited to use with turbofans as the teachings may be applied to other types of turbine engines, such as a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used in this description, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 and sets airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7]^{0.5}$]. The "Low corrected fan tip speed", according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
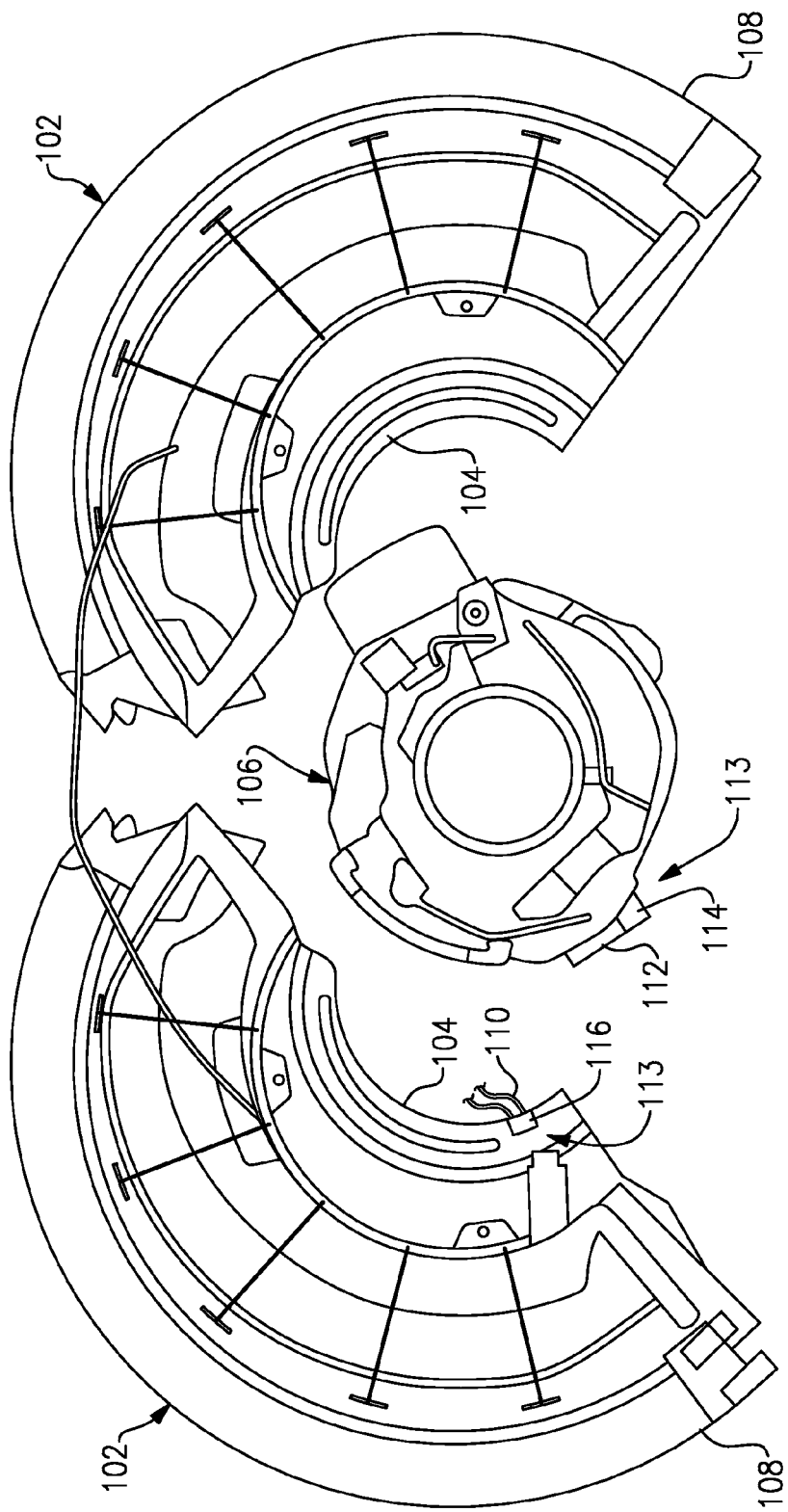
FIG. 2 schematically illustrates selected portions of the example gas turbine engine.

FIG. 2 schematically illustrates selected portions of a gas turbine engine such as the example engine 20 from FIG. 1. A nacelle 100 establishes a housing for the engine 20. Two moveable nacelle portions 102 are shown in FIG. 2. The nacelle portions 102 are moveable between an open position (which is illustrated in FIG. 2) and a closed position. When the moveable nacelle portions 102 are in the closed position, the nacelle 100 establishes a cavity within which components of the engines are received. In this example an inner surface 104 on the nacelle portions 102 establishes the envelope of the cavity. Some engine components 106 are received in the cavity. The moveable nacelle portions 102 also include an outer surface 108 that establishes an exterior of the housing for the engine 20.

Figure 3:
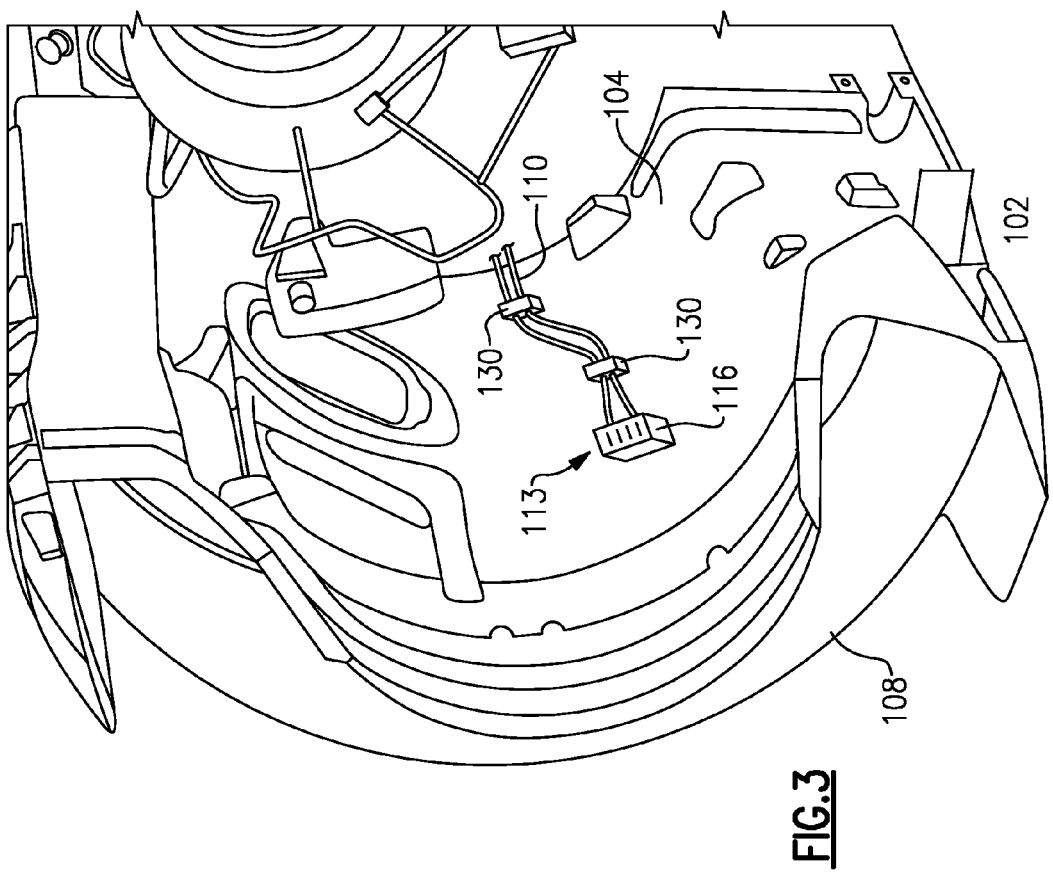
FIG. 3 schematically illustrates some of the components from FIG. 2 seen from a different perspective.

As can be appreciated from FIGS. 2 and 3, a plurality of power feeder cables 110 are at least partially supported on the nacelle portions 102. In this example, the cables 110 are supported on the inner surface 104 of the nacelle portions 102. The power feeder cables 10 are associated with an integrated drive generator (IDG) 112 that is received within the cavity established by the nacelle portions 102 when they are in a closed position.

The illustrated arrangement includes a connector 113 for establishing an electrically conductive connection between the cables 110 and the IDG 112. In this example, a first connector portion 114 is situated to remain in a fixed position relative to the IDG 112. In some examples, the first connector portion 114 is formed as a part of the IDG 112 or a housing of the IDG 112. A second connector portion 116 is supported at least partially on one of the nacelle portions 102. In this example, the second connector portion 116 protrudes at least somewhat beyond the inner surface 104 toward an interior of the cavity within the nacelle 100. The connector portions 114 and 116 are situated relative to each other so that as the moveable nacelle portion 102 moves into the closed position, the connector portions establish an electrically conductive connection between the cables 110 and the IDG 112.

Figure 4:
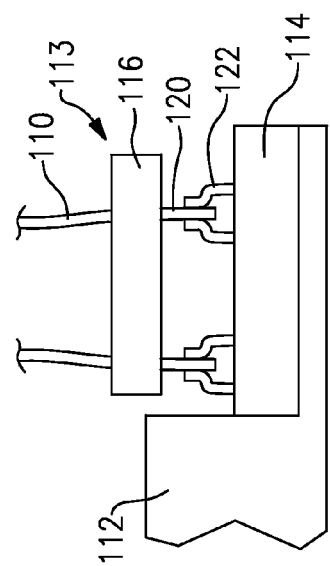
FIG. 4 schematically illustrates an example connector.

FIG. 4 schematically illustrates one example arrangement. In this example, the second connector portion 116 includes a plurality of male connector members 120. The example first connector portion 114 includes a corresponding plurality of female connector members 122. In the illustrated example, the male connector members 120 comprise tabs made of electrically conductive material. The female connector members 122 comprise clamp springs that at least partially receive the male connector members 120 when the moveable nacelle portion 102 moves into the closed position.

In another example, the first connector portion 114 and the second connector portion 116 are magnetically secured together. A magnetic clamping mechanism includes a magnet that holds the connector portions tightly together. The interface may include male and female features with a magnet. One feature of using a magnet is that it can hold the assembly tightly together under extreme conditions.

As the nacelle portion 102 moves from the closed position toward the open position, that separates the first connector portion 114 from the second connector portion 116. Therefore, as the moveable nacelle portion 102 moves away from the IDG 112, that disconnects the male connector members 120 and the female connector members 122. Supporting the first connector portion 114 to remain fixed relative to the IDG 112 and supporting the second connector portion 116 on the moveable nacelle portion 102 facilitates connecting the cables 110 and the IDG 112 or disconnecting them.

Having the cables 110 and a connector portion 116 supported on the moveable nacelle portion 102 eliminates the complexities and challenges associated with attempting to route power cables along the engine components of a gas turbine engine. Supporting the cables 110 on the nacelle portion 102 may include situating the cables 110 along the inner surface 104.

In the illustrated example, a plurality of brackets 130 support corresponding sections of the cables 110 on the inner surface 104 of the moveable nacelle portion 102. The brackets 130 are secured to the inner surface 104 in this example. A variety of bracket configurations are possible. One example includes blocks that have openings or channels through which the cables 110 are received. Another example includes clips or clamps that are secured to the inner surface 104 and hold the cables 110 in place.

One feature of such an arrangement is that it keeps the cables 110 neatly situated and out of the way during a maintenance or repair procedure, for example. Whenever the nacelle portion 102 is opened, the cables 110 are lifted away from the engine components and out of the way of a technician who requires access to the engine components. At the same time, the cables 110 are conveniently disconnected from the IDG 112. With the illustrated arrangement it becomes easier to perform work on a gas turbine engine.

The illustrated example has the additional feature of easily establishing an electrically conductive connection between the cables 110 and the IDG 112 whenever the moveable nacelle portion 102 is moved into the closed position. Instead of having to manually make a connection of each individual wire with an appropriate part of the IDG 112, the connector 113 facilitates easily (and repeatedly, if necessary) establishing a reliable and secure, electrically conductive connection between the cables 110 and the IDG 112. That same connection can be interrupted easily by moving the nacelle portion 102 out of the closed position.

The illustrated example also facilitates more economies during engine assembly procedures. With the illustrated arrangement, labor time is reduced because situating the cables 110 on the inner surface 104 of the nacelle portion 102 is much more straightforward than the more relatively complicated procedures required for attempting to route the cables along engine components. Additionally, there are no special requirements for the engine components to have features that would facilitate supporting the cables on the engine components.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A gas turbine engine component assembly, comprising:
a nacelle including a moveable portion;
a generator configured to be received within a space established by the nacelle;
a plurality of cables at least partially supported on the moveable portion of the nacelle, the plurality of cables being selectively electrically coupled with the generator; and
a connector including a first portion supported within the space near the generator and a second portion coupled to the plurality of cables near an end of the cables, the first and second portions being selectively coupled to electrically couple the cables with the generator, wherein
the moveable portion of the nacelle is moveable between an open position and a closed position;
the connector second portion is supported on the moveable portion of the nacelle; and
the connector first portion is situated in a position where the connector second portion makes an electrically conductive connection with the connector first portion when the moveable portion of the nacelle is in the closed position.

2. The assembly of claim 1, wherein
at least one of the connector first portion or the connector second portion comprises a male connector member; and
the other of the connector second portion or the connector first portion comprises a corresponding female connector member situated to at least partially receive the male connector member when the moveable portion of the nacelle is in the closed position.

3. The assembly of claim 1, wherein
the connector first portion is magnetically coupled with the connector second portion when the moveable portion of the nacelle is in the closed position.

4. The assembly of claim 1, wherein the connector first and second portions are electrically disconnected when the moveable portion of the nacelle is in the open position.

5. The assembly of claim 1, wherein the connector first portion is formed as part of the generator.

6. A gas turbine engine component assembly, comprising:
a nacelle including a moveable portion;
a generator configured to be received within a space established by the nacelle; and
a plurality of cables at least partially supported on the moveable portion of the nacelle, the plurality of cables being selectively electrically coupled with the generator;

the moveable portion of the nacelle has an inner surface facing toward the generator; and
the cables are at least partially supported on the inner surface; and
a plurality of brackets secured to the inner surface of the moveable portion of the nacelle, each of the brackets supporting a corresponding section of at least one of the cables.

7. A gas turbine engine component assembly, comprising:
a nacelle including a moveable portion that at least partially establishes a cavity within the nacelle when the moveable portion is in a closed position; and
an electrically conductive connector including a first connector portion within the cavity and a second connector portion supported on the moveable portion, the first and second connector portions selectively establishing an electrically conductive connection when the moveable portion moves into the closed position.

8. The assembly of claim 7, comprising
a plurality of cables at least partially supported on the moveable portion of the nacelle, the plurality of cables being electrically coupled with the second connector portion.

9. The assembly of claim 8, comprising:
a generator near the first connector portion within the cavity and electrically connected with the connector first portion, and wherein the cables are electrically connected to the generator when the moveable portion of the nacelle moves into the closed position.

10. The assembly of claim 9, wherein the connector first portion comprises a part of the generator.

11. The assembly of claim 8, wherein
the moveable portion of the nacelle has an inner surface; and
the cables are at least partially supported on the inner surface.

12. The assembly of claim 11, comprising
a plurality of brackets secured to the inner surface of the moveable portion of the nacelle, each of the brackets supporting a corresponding section of at least one of the cables.

13. The assembly of claim 7, wherein
at least one of the connector first portion or the connector second portion comprises a male connector member; and
the other of the connector second portion or the connector first portion comprises a corresponding female connector member situated to at least partially receive the male connector member when the moveable portion of the nacelle is in the closed position.

14. The assembly of claim 13, wherein
the male connector member comprises a tab; and
the female connector member comprises a clamp spring.

15. The assembly of claim 7, wherein the connector first portion is magnetically coupled with the second portion.

16. The assembly of claim 7, wherein the connector first and second portions are electrically disconnected when the moveable portion of the nacelle is in another position.

17. A method of working on a gas turbine engine, comprising:
moving a nacelle portion into one of an open position or a closed position; and at least one of:
establishing an electrically conductive connection between an integrated drive generator and a plurality of cables at least partially supported on the nacelle portion when moving the nacelle portion into the closed position; or disconnecting the electrically conductive connection between the integrated drive generator and the plurality of cables when moving the nacelle portion into the open position.

* * * * *